United States Patent [19]

Riback

[11] Patent Number: 4,736,869

[45] Date of Patent: Apr. 12, 1988

[54] SUBMERSIBLE SEALED HOUSING

[75] Inventor: Richard Riback, Highland Park, Ill.

[73] Assignee: Expert Corporation, Chicago, Ill.

[21] Appl. No.: 899,420

[22] Filed: Aug. 22, 1986

[51] Int. Cl.$^4$ .............................................. B65D 41/00
[52] U.S. Cl. .................................... 220/359; 220/378; 220/67
[58] Field of Search ............... 220/359, 319, 322, 378, 220/67

[56] References Cited

U.S. PATENT DOCUMENTS

| | | | |
|---|---|---|---|
| 3,685,682 | 8/1972 | Frey, III | 220/359 |
| 3,801,727 | 4/1974 | Wilkinson et al. | 220/359 |
| 3,825,148 | 7/1974 | Hunter et al. | 220/359 |
| 3,910,448 | 10/1975 | Evans et al. | 220/359 |
| 4,044,941 | 8/1977 | Knudsen | 220/359 |
| 4,215,797 | 8/1980 | Chen | 220/359 |
| 4,659,405 | 4/1987 | Walter | 220/359 |

OTHER PUBLICATIONS

"Joining the Engineering Plastic", Aug. 1980, p. 14 by Edward M. Petrie.

Primary Examiner—Joseph Man-Fu Moy
Attorney, Agent, or Firm—Laff, Whitesel, Conte & Saret

[57] ABSTRACT

A novel housing assembly is disclosed. The housing assembly includes a cover section and an end frame which may be of dissimilar materials. The cover section and end frame define abutting openings. The end frame opening is circumscribed by a radial projection and the cover section opening is circumscribed by an axial flange. The radial projection is frictionally retained within the axial flange. A retaining ring is integrally secured to the cover section and holds the end frame to the cover section. Shear elements are provided by the retaining ring and cover section to substantially increase the shear force resistance capacity of the juncture between the cover section and the end frame.

8 Claims, 2 Drawing Sheets

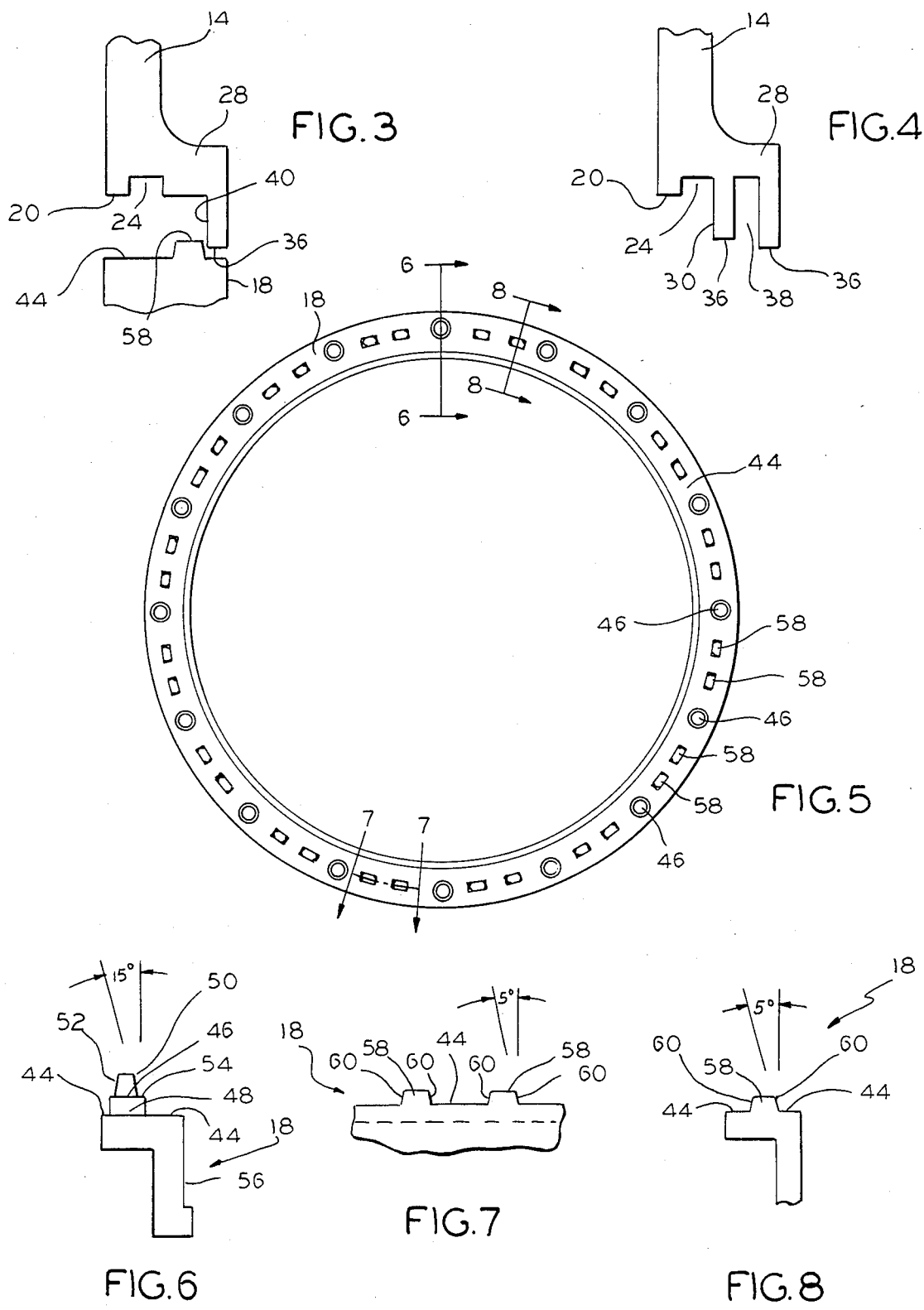

SUBMERSIBLE SEALED HOUSING

BACKGROUND OF THE INVENTION

1. Field of the Invention

The present invention relates to sealed housings suitable for use submerged in a liquid environment. More particularly, the present invention relates to a novel construction and assembly technique for an enclosure for submersible mechanical equipment. The invention allows the housing to be conveniently constructed from dissimilar materials or difficult geometries in a heretofore unknown economical manner.

2. Description of the Prior Art

A wide variety of housings for submersible mechanical equipment such as pump and motor devices have long been known in the art. One particular style of fluid pump which is generally intended to be either permanently or temporarily mounted within a shallow pit has become commonly known as a sump pump. These pump and motor devices may be powered by conventional gasoline or electric motors, as desired.

For a variety of engineering considerations, it is beneficial to produce a portion of the housing out of metal. For example, during assembly of a motor in the housing, it may be required to press the stator into the housing. A plastic housing would be crushed in such an operation. Simultaneously, for a variety of economic and aesthetic considerations, it is desirable to produce the remaining portion of the housing out of lightweight materials such as plastic or a composite material. Therefore, to best satisfy these requirements, housings were constructed which used metal pieces or sections when necessary to satisfy the above requirements.

Prior art submersible housings constructed from dissimilar materials are generally assembled in inefficient manners. Most often, two housing sections are simply abutted and include flanges to form a projection that circumscribes the exterior of the housing. This projection is formed in part by each section and is generally centered along the seam separating the sections. A gasket or seal placed between the section flanges precludes fluid seepage within the housing. A steel band clamp which is adapted to engage the projection is put into place and maintains pressure on the individual sections. Each section is biased towards the other, securing the housing sections together as the diameter of the clamp is reduced by rotation of a drive sump.

These prior art housing assemblies have inherent design flaws which preclude, to some extent, their usefulness for their intended function. The band clamp provides a measure of compression but little more. Finally, producing the finished assembly is labor intensive, material expensive, and does not easily allow for automation of the assembly.

SUMMARY OF THE INVENTION

It is an object of the present invention to provide an economical submersible housing from components of dissimilar materials.

It is a further object of the present invention to provide a housing for mechanical equipment having two parts joined together to form a sealed compartment, and providing added shear strength in the bond between the two parts.

In a broad embodiment, therefore, this and other objects are provided by an improved mechanical equipment housing including an integral retaining ring having shear tabs which engage part of the housing and provide the assembly with added shear strength.

While the housing which comprises the present invention is referred to as a mechanical equipment housing in the preferred embodiment, it will be understood that the invention is applicable to many types of structures or housings which are adapted to be produced from at least two sections of similar or dissimilar materials.

BRIEF DESCRIPTION OF THE DRAWINGS

To aid in the illustration and understanding of the invention, the following drawings have been provided:

FIG. 3 is a partial section view of the housing taken generally along the line 3—3 of FIG. 2;

FIG. 4 is a partial section view of the housing taken generally along the line 4—4 of FIG. 2;

FIG. 5 is a top plan view of the housing taken generally along the line of 5—5 of FIG. 1;

FIG. 6 is a partial section view of the housing taken generally along the line 6—6 of FIG. 5;

FIG. 7 is a partial section view of the housing taken generally along the line 7—7 of FIG. 5; and FIG. 8 is a partial section view of the housing taken generally along the line 8—8 of FIG. 5.

DESCRIPTIQN OF THE PREFERRED EMBODIMENT

Figure 1:
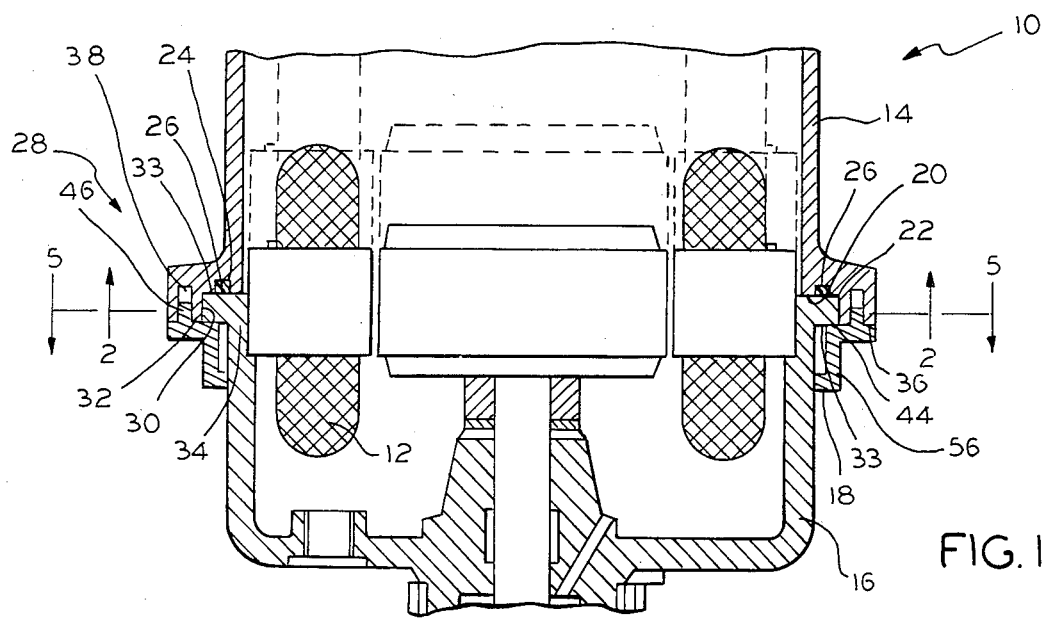
FIG. 1 is a cut-away elevation view of a motor housing embodying the present invention.

The present invention is directed towards a housing assembly, generally designated by the numeral 10 in FIG. 1. Housing 10 contains a conventional electric motor 12 which drives associated pumping equipment, and comprises cover section 14 and end frame section 16, which may be made of any conventional rigid material. However, since motor 12 is mounted to end frame 16, for durability it is preferred that end frame 16 be produced from a suitable material, such as iron, bronze, aluminum and the like.

Using a metal base provides certain engineering properties not found in thermoplastics, such as more efficient heat transfer, providing a bearing surface for motor alignment were required, providing greater tolerance of hoop stress at elevated temperatures, and providing heat and fire resistance required by building and industry codes.

Cover section 14 is more economically produced from any suitable amorphous or crystalline thermoplastic material such as ABS, polycarbonate, acrylic, polystyrene and the like. End frame 16 is secured to cover 14 by retaining ring 18, as will be further described in detail hereinbelow.

Retaining ring 18 is fused to cover 14 by well known techniques. Therefore, retaining ring 18 is also produced from a suitable thermoplastic material, which may or may not be the same as that chosen for cover 14. The particular choice of materials selected for cover 14 and retaining ring 18 will necessarily depend upon the desired rigidity of cover 14 and/or retaining ring 18, as well as both the relative melt temperatures and the weld compatability of the materials prospectively chosen.

Cover 14 mating surface 20 and end frame 16 mating surface 22, are adapted to abut each other. The mating surface geometry is desirably annular, although any other suitable shapes may be used. Mating surface 22 of end frame 16 is planar and smooth, as is cover 14 mating surface 20. If desired, a pin and receiving socket may be provided in the mating surfaces 20, 22 so as to preclude relative rotation between end frame 16 and cover 14. Mating surface 20 includes an annular channel 24 (FIGS. 1, 3) which is adapted to receive a sealing compression gasket 26.

Cover mating surface 20 is also provided with an axially projecting flange section 28. Flange section 28 includes an inner radial surface 30 (FIG. 4) of substantially the same diameter and dimensions as the outer radial surface 32 of radially extending flange 33 which forms part of end frame 16. The extending flange 33 of end frame 16 containing mating surface 22 is therefore inserted within flange section 28 during the construction of housing 10, as will be further explained.

Figure 2:
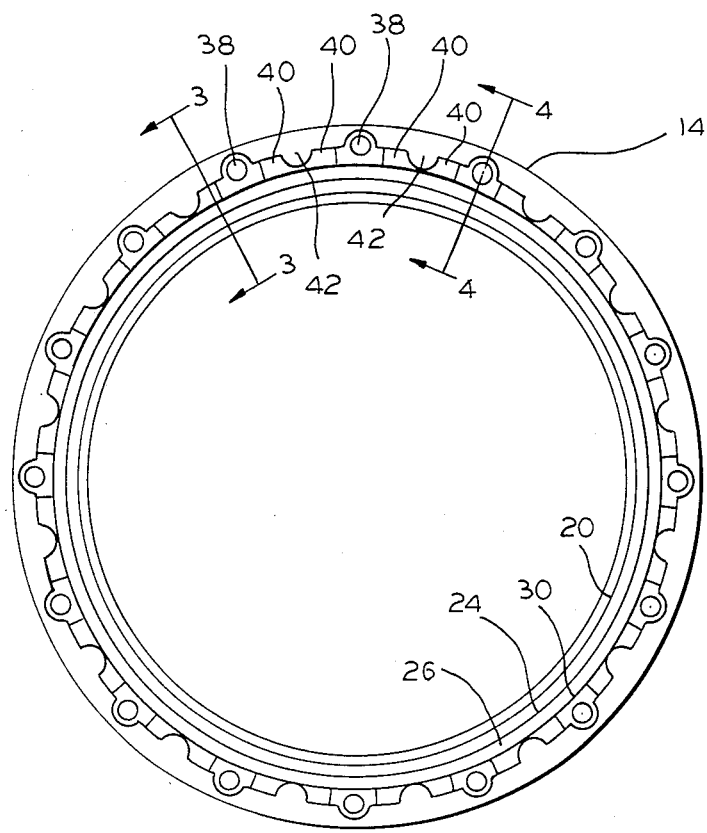
FIG. 2 is a bottom plan view of the housing taken generally along the line 2—2 of FIG. 1.

As stated previously, retaining ring 18 engages flange section 28. As best seen in FIGS. 1 and 2, flange section 28 includes a welding surface 36 oriented parallel to cover mating surface 20. Welding surface 36 contains a number of guide-receiving holes or apertures 38. In the preferred embodiment, guide holes 38 are equally spaced about welding surface 36 thereby allowing retaining ring 18 to be installed in several positions rotatably relative to cover 14. If it is desirable that retaining ring 18 only be installed in a particular position, guide holes 38 may be distributed about welding surface 36 in an asymmetric manner.

Located between neighboring pairs of guide holes 38 are open sided channels 40. Channels 40 are defined by the general periphery of welding surface 36 and ejector pin surfaces 42. Ejector pin surfaces 42 are required as a push-off surface to enable an ejector plate (unillustrated) to push cover 14 out of the mold in which it is formed. Cross sections of cover 14 through both channel 40 and guide hole 38 ar shown in FIGS. 3 and 4, respectively. In both FIGS. 3 and 4, gasket receiving channel 24 is clearly illustrated as is the axially projecting flange section 28.

Capture surface 44 of retaining ring 18 is clearly illustrated in FIGS. 1 and 5. Capture surface 44 includes guide pins 46 arranged in number and configuration so as to correspond with and engage guide pin holes 38. Guide pins 46 function to supply the needed welding material for subsequent ultrasonic plastic assembly steps and afterward to axially locate retaining ring 18.

The shape of guide pins 46 is best seen in FIG. 6. Guide pins 46 each include a cylindrical base portion 48 and a generally frusto-conical tip portion 50. In the preferred embodiment, tip portion 50 is preferentially angled at 15 from parallel with base portion 48. In other words, the sides of frusto-conical tip portion converge at an angle of 150°. However, other angular configurations could be utilized. Base portion 48 supplies the majority of the plastic bonding material used during the ultrasonic assembly. Conical tip portion 50 allows desired bonding material to flow into and bond to guide hole 38 during the welding procedure. Base portion 48 is preferentially of greater diameter than either the wide part 52 of conical tip 50 or guide pin hole 38. Therefore, a step portion 54 is formed in the guide pin 46 which seats against the welding surface 36 around guide pin hole 38 (FIGS. 3 and 4) before the ultrasonic welding procedure takes place.

Also illustrated in FIG. 6 is the cross-sectional shape of retaining ring 18. Retaining ring 18 includes capture surface 44 as well as an axially oriented wall 56. Wall 56 is designed to locate on a section of end frame 16 at mating surface end 34 (FIG. 1). Wall 56 is of substantially the same thickness as capture surface 44 but is of greater length, thereby giving retaining ring 18 an "L"-shaped cross section. This shape has proven to provide strength and rigidity.

Capture surface 44 also includes shear tabs 58 (FIGS. 3, 5 and 7) arranged in number and configuration so as to engage stud channels 40 once housing 10 is fully assembled. However, before housing 10 is ultrasonically welded into a single piece, steps 54 of guide pins 46 prevent shear tabs 58 from contacting channels 40. Capture surface 44 extends radially inwardly of each of pins 46 and shear tabs 58. The outermost dimension of end frame 16 mating surface 22 is adapted to frictionally engage inner surface 30 of flange section 28. The relative locations of shear tabs 58, channels 40, and inner surface 30 being previously defined, the inner radial extension of capture surface 44 will fit circumferentially over mating surface end 34 of end frame 16.

The inside walls 60 of each of shear tabs 58, as best seen in FIGS. 7 and 8, do not extend perpendicularly from capture surface 44. Rather, capture surface 44 and inside shear tab walls 60 define a slightly obtuse angle. Inside walls 60 are preferentially angled at 5 from perpendicular with capture surface 44 to assist in removing retaining ring 18 from its mold. Shear tabs 58 are not intended to be welded to any part of cover 14, but to provide shear strength for the assembled housing 10, as will be explained, in addition to that provided by guide pins 38 after ultrasonic welding.

Housing 10 is assembled as follows: motor 12 is prepared and mounted within end frame 16. Gasket 26 is then placed within gasket channel 24. End frame 16 is next placed against cover 14 by abutting mating surface 20 with mating surface 22. If a pin and socket are provided in mating surfaces 20 and 22, cover 14 is rotated with respect to end frame 16 until the pin and socket are engaged. Gasket 26 will seal the interface between end frame 16 and cover 14 when compressive pressure is applied to the housing by retaining ring 18 after assembly. At this point, retaining ring 18 is inserted over end frame 16. Pins 46 are guided into guide holes 38 until steps 54 abut against welding surface 36. As step portion 54 abuts on welding surface 36, capture surface 44 is displaced above both welding surface 36 and end 34 of end frame 16.

Compressive pressure is then applied to retaining ring 18 to force guide pins 46 into guide holes 38. Next, the vibrating tips of an ultrasonic vibrating source are applied to flange section 28 of cover 14, and guide pins 46 are thus ultrasonically welded within guide holes 38 as retaining ring 18 is compressed towards cover 14. As pins 46 are welded, pin material is melted away from step 54 of cylindrical portion 48, thereby allowing retaining ring 18 to be further moved toward cover 14 under pressure. The welding and requisite movement of retaining ring 18 relative to cover 14 continues until retaining ring 18 bottoms out and cannot be further displaced. The flange portion 33 of end frame 16 is now securely held between retaining ring 18 and surface 20 of flange 28. The assembly procedure is now completed, economically yielding an integral sealed housing produced from dissimilar materials.

As retaining ring 18 is compressed toward cover 14, one of the side walls of each of shear tabs 58 are brought into abutting engagement with open sided channels 40 of cover 14, between guide holes 38 and ejector pin surfaces 42. The shear pins thus provide added shear strength between cover 14 and retaining ring 18. This is an important feature of the present invention since, in most instances, the housing unit 10 with its associated mechanical equipment inside, must pass a drop test which imposes both tensile and shear stresses on the bonded housing. In the present embodiment of the invention, guide pins 46 provide the requisite tensile strength. However, only a certain area is available at the base of guide pins 46 to provide the requisite amount of shear strength capacity. Therefore, the present invention contemplates the use of shear tabs 58 abutting channels 40 to add to the shear strength of the unit. The base of shear tabs 58 is rectangularly shaped to provide decreased pressure along the shear plane.

The present invention produces increased shear strength area at the point of juncture between cover 14 and retaining ring 18 without increasing the area of the base of welding or guide pins 46. By limiting the size of guide pins 46, the power needed to perform the welding operation is reduced, thereby providing an important cost saving in the production of housing 10. Therefore, the shear strength of the juncture of cover 14 and retaining ring 18 is provided by a combination of the area of the bases of welded guide pins 46, plus the area of the bases of shear tabs 58.

While a preferred embodiment of the invention has been described and illustrated, further modifications may be made thereto which fall within the spirit and scope of the invention. It is contemplated, therefore, that any such modifications and their equivalents will be covered by the following claims

What is claimed is:

1. A sealed housing assembly for mechanical equipment, said housing comprising:
    a cover section and an end frame section wherein:
    one end of said cover section defines an opening, said opening circumscribed by an axially projecting flange section, one end of said end frame defining an opening, said end frame opening being adapted to abut said cover opening, said end frame opening being circumscribed by a radially extending projection, said projection adapted to be frictionally engaged by said flange section to form a juncture between said cover section and said end frame, said housing further including;
    means for integrally securing a retaining ring to said cover section to retain said end frame in abutment with said cover section whereby a compressive pressure is exerted against said end frame biasing said end frame in a direction towards and in abutment with said cover;
    said retaining ring integrally secured to said cover section by ultrasonic welding;
    said retaining ring and said cover section providing, in an unassembled condition, a plurality of guide pin apertures and a plurality of corresponding guide pins, said guide pins being insertable into said guide pin apertures, wherein said guide pins provide welding material for said ultrasonic welding.

2. The sealed housing assembly of claim 1 wherein said guide pin holes are provided within said flange section and said guide pins extend from said retaining ring.

3. A sealed housing assembly for mechanical equipment, said housing comprising:
    a cover section and an end frame section, wherein:
    one end of said cover section defines an opening, said opening circumscribed by an axially projecting flange section, one end of said end frame defining an opening, said end frame opening being adapted to abut said cover opening, said end frame opening being circumscribed by a radially extending projection, said projection adapted to be frictionally engaged by said flange section to form a juncture between said cover section and said end frame, said housing further including;
    means for integrally securing a retaining ring to said cover section to retain said end frame in abutment with said cover section whereby a compressive pressure is exerted against said end frame biasing said end frame in a direction towards and in abutment with said cover;
    said retaining ring integrally secured to said cover section by ultrasonic welding;
    said retaining ring and said cover section providing, in an unassembled condition, a plurality of guide pin apertures and a plurality of corresponding guide pins, said guide pins being insertable into said guide pin apertures, wherein said guide pins provide welding material for said ultrasonic welding;
    said guide pins including generally cylindrical base sections and generally frusto-conical tip sections, said tip sections having a narrow end and a wide end wherein said wide end joins said cylindrical base, said wide end having a diameter narrower than a diameter of said cylindrical base thereby forming a step whereby said welding material is provided by said base and fluid flow for said welding material is provided by said tip.

4. The sealed housing assembly of claim 3 whereby said frusto-concial tip section of said guide pin defines an angle of convergence of approximately 150°.

5. The sealed housing assembly of claim 3 wherein said guide pin apertures have a diameter less than the diameter of said cylindrical base.

6. A sealed housing assembly for mechanical equipment, said housing comprising:
    a cover section and an end frame section, wherein:
    one end of said cover section defines an opening, said opening circumscribed by an axially projecting flange section, one end of said end frame defining an opening, said end frame opening being adapted to abut said cover opening, said end frame opening being circumscribed by a radially extending projection, said projection adapted to be frictionally engaged by said flange section to form a juncture between said cover section and said end frame, said housing further including;
    means for integrally securing a retaining ring to said cover section to retain said end frame in abutment with said cover section whereby a compressive pressure is exerted against said end frame biasing said end frame in a direction towards and in abutment with said cover;
    said retaining ring and said cover section providing a plurality of shear tabs and a plurality of receiving channels, said shear tabs abutting the walls of said channels when said retaining ring is secured to said cover section.

7. A sealed housing assembly for mechanical equipment, said housing comprising:
    a cover section and an end frame section, wherein:
    one end of said cover section defines an opening, said opening circumscribed by an axially projecting flange section, one end of said end frame defining an opening, said end frame opening being adapted to abut said cover opening, said end frame opening being circumscribed by a radially extending projection, said projection adapted to be frictionally engaged by said flange section to form a juncture between said cover section and said end frame, said housing further including;

means for integrally securing a retaining ring to said cover section to retain said end frame in abutment with said cover section whereby a compressive pressure is exerted against said end frame biasing said end frame in a direction towards and in abutment with said cover;

said retaining ring and said cover section each providing shear elements which come into contact when said retaining ring is secured to said cover section to provide resistance to shear forces applied to said juncture between said cover section and said end frame.

8. A sealed housing assembly for mechanical equipment, said housing comprising:

a cover section and an end frame section wherein:

one end of said cover section defines an opening, said opening circumscribed by an axially projecting flange section, one end of said end frame defining an opening, said end frame opening being adapted to abut said cover opening, said end frame opening being circumscribed by a radially extending projection, said projection adapted to be frictionally engaged by said flange section to form a juncture between said cover section and said end frame, said housing further including;

means for integrally securing a retaining ring to said cover section to retain said end frame in abutment with said cover whereby a compressive pressure is exerted against said end frame biasing said end frame in a direction towards and in abutment with said cover;

said retaining ring is integrally secured to said cover section by ultrasonic welding;

said retaining ring and said cover section provide, in an unassembled condition, a plurality of guide pin apertures and a plurality of corresponding guide pins, said guide pins being insertable into said guide pin apertures, wherein said guide pins provide welding material for said ultrasonic welding;

said retaining ring and said cover section providing a plurality of shear tabs and a plurality of receiving channels, said shear tabs abuting the walls of said channels when said retaining ring is secured to said cover section.

* * * * *